US008027875B2

(12) United States Patent
Harper

(10) Patent No.: US 8,027,875 B2
(45) Date of Patent: Sep. 27, 2011

(54) METHOD FOR MEASURING PACKET ADVERTISING EFFECTIVENESS

(76) Inventor: William A. Harper, Redmond, WA (US)

( * ) Notice: Subject to any disclaimer, the term of this patent is extended or adjusted under 35 U.S.C. 154(b) by 637 days.

(21) Appl. No.: 12/218,011

(22) Filed: Jul. 10, 2008

(65) Prior Publication Data
US 2010/0010867 A1    Jan. 14, 2010

(51) Int. Cl.
G06Q 30/00    (2006.01)
(52) U.S. Cl. .................................................. 705/14.41
(58) Field of Classification Search .............. 705/14, 705/14.41
See application file for complete search history.

(56) References Cited

U.S. PATENT DOCUMENTS

| 6,152,369 | A | * | 11/2000 | Wilz et al. | 235/462.01 |
| 6,836,799 | B1 | * | 12/2004 | Philyaw et al. | 709/224 |
| 6,898,571 | B1 | * | 5/2005 | Val et al. | 705/14.39 |
| 7,322,465 | B2 | | 1/2008 | Harper | |
| 7,681,346 | B2 | * | 3/2010 | Bruce | 40/324 |
| 2002/0069100 | A1 | * | 6/2002 | Arberman | 705/10 |
| 2002/0194081 | A1 | * | 12/2002 | Perkowski | 705/26 |
| 2004/0103029 | A1 | * | 5/2004 | McClintock | 705/14 |
| 2005/0104366 | A1 | * | 5/2005 | McClintock | 283/81 |
| 2006/0106623 | A1 | * | 5/2006 | Lebaschi | 705/1 |
| 2009/0030780 | A1 | * | 1/2009 | York et al. | 705/10 |
| 2009/0126240 | A1 | * | 5/2009 | Thjai et al. | 40/299.01 |

OTHER PUBLICATIONS

Stone, Mary. "Pittsford firms create program to measure marketing," Rochester Business Journal, Feb. 18, 2005.*
U.S. Appl. No. 11/365,711, filed Mar. 1, 2007.
U.S. Appl. No. 12/215,015.

* cited by examiner

Primary Examiner — Michelle Tarae

(57) ABSTRACT

This invention generally relates to a method for measuring the effectiveness of an advertising method that facilitates purchases involving or assisted by a website. More particularly the method discloses how to measure the advertising effectiveness of widely distributed resealable packets of liquid that bear website addresses to prompt or facilitate direct access to websites. Data derived from the packet's manufacturing, distribution and website access is used in measuring the advertising effectiveness disclosed in this method.

21 Claims, 2 Drawing Sheets

Method for Measuring Packet Advertising Effectivensess

METHOD FOR MEASURING PACKET ADVERTISING EFFECTIVENESS

RELATED APPLICATIONS

This patent application is related to two other pending patent applications: Ser. No. 11/365,711 entitled "Resealable Packets of Liquid", filed 1 Mar. 2006; and Ser. No. 12/215,015 entitled "Method for Packet Facilitated E-Commerce", filed 23 Jun. 2008; the disclosure of both are hereby incorporated by reference. Further, U.S. Pat. No. 7,322,465 entitled "Method of Using Liquid Packets with Advertising Inserts", issued 29 Jan. 2008, is incorporated by reference herein.

FIELD OF THE INVENTION

This invention generally relates to a method for measuring the effectiveness of an advertising method that facilitates purchases involving or assisted by a website. More particularly the method discloses how to measure the advertising effectiveness of widely distributed resealable packets of useful liquid that bear website addresses to prompt or facilitate direct access to that website.

BACKGROUND OF THE INVENTION

By 2007 there were an estimated 110 million distinct websites and some 30 billion web pages on the World Wide Web (web) accessible through the Internet; these numbers continue to grow rapidly with each day. Every website has a unique web address technically known as a Uniform Resource Locator (URL) which appears as a string of routing numbers (e.g., 42.141.58.103). But such strings are difficult to recall so Internet users quickly developed a more mnemonic device known as domain names (e.g., www.example.com); such catchy domain name website addresses have become the public face of the URL so as to ease e-mail correspondence and general access to websites. In the past decade entrepreneurs and other business-oriented individuals discovered and began development of the incredible commercial opportunities residing in Internet accessed websites where barriers to and costs for transacting business are virtually non-existent for the motivated buyer. Once connected, it often becomes only a matter of choice or travel as to what to buy online or at a referred place of business. Entering an e-commerce website has become the virtual equivalent of going into a hardware store or restaurant; rarely does the buyer leave with nothing. This is particularly true if the website engages the buyer on a personal level with incentive or reward offerings in the form of effective, albeit virtual, marketeering. The real challenge facing business owners who have embraced e-commerce is getting the buyer to and through their virtual doorway, to their place of business by way of their web address. Essentially, for the business owner, getting their needle of a website found in the haystack of the web. A marketing method which aids buyers and sellers in circumventing this haystack problem is disclosed in U.S. patent application Ser. No. 12/215,015 entitled "Method for Packet Facilitated E-commerce".

However, another problem remains for the business owner who chooses to engage in e-commerce by direct packet marketeering. It is a problem not unique to direct packets but shared by all forms of advertising: how to measure the effectiveness of any advertising campaign and do so with minimal effort and at an affordable price. What advertising content, timing, audience, inducements, and a myriad of other factors work best together or are superior to another comparable campaign? The finest products and services go unnoticed, and worst, unsold, if the business owner fails to effectively advertise. Yet, measuring the effectiveness of an advertising campaign is very complex and very costly, easily taking more time, resources and monies than the advertising campaign itself. The skill level and effort required soon convinces the business owner any effort at effective advertising measurement is largely unknowable, undoable, and unprofitable. Left with no alternative, the requisite advertising budget is thus spent on traditional venues such as newspaper ads, radio spots, direct mailers, and the like where hoary statistical generalities and even vaguer surmises are substituted for any true measurements of effectiveness. The nature of e-commerce has the means to effectively measure advertising if a technique existed for gauging the effectiveness of a specific means that fishes out a buyer from the crowd and bring that buyer to and through the business owner's virtual shop door as a website.

Accordingly, a method for measuring comparative means that leads to and bridges the disconnect between buyer and website is required. Specifically, with regards to resealable packets of useful liquids distributed with advertising messages to foster the connect between buyer and website, a method is required whereby the business owner can at low-cost and minimal effort evaluate the effectiveness of any direct packet marketing strategy individually or comparatively. Further, the owner as vendor, armed with insight, can make important changes to better spend an always limited advertising budget. There is a significant need for such a straightforward method for measuring packet advertising effectiveness.

SUMMARY OF THE INVENTION

An exemplary embodiment of the invention relates to a method that provides a business owner as vendor with analysis that effectively measures the advertising impact of comparative direct packet marketing campaigns. This analysis is based on data derived from the manufacturing, distribution and website use of resealable packets of useful liquid that bear advertising which includes at least a website address and identifier markings such as a serial number, group number, product category, graphic mark or similar item. A key aspect of this method is that the provider of the packets, the manufacturer, holds and maintains the database collecting the data as developed in addition to providing any and all analysis of that data for the vendor (business owner) who ordered and distributes the packets, Additionally, the holding provided also hosts the website so as to maintain standards as to the look and feel of the site. This arrangement permits seamless, quick, and accurate data update and access so timely analysis on emerging advertising trends can be provided and apropos informed action taken.

The depth and detail of data derived from the manufacturing and distribution steps can be extensive. For example, manufacturing can supply data on a great number of details that characterize the packet, its liquid, and advertising message. The distribution can supply data derived from the time, place, audience, and other circumstances involving the actual conditions surrounding the dispersal into a population. Website access, facilitated and prompted by the packets, will also provide significant data for recording in the database. Such data, taken as a whole or in part, mined and analyzed for content, will provide significant quantifiable information as to the effectiveness of a given advertising campaign.

Consequently, a primary object of the present invention is to provide a novel and significant advancement in the e-commerce art by capturing manufacturing, distribution and website data for resealable packets of useful liquid so as to provide a measured analysis indicating effective advertising characteristics of value to the advertising vendor.

Another object of the present invention is to create and maintain a provider held database populated with data derived from packet manufacturing, distribution and associated website activities.

Another object of the present invention is to have the provider of the manufactured packets host and operate the vendor's website.

Another object of the present invention is to have the provider furnish the vendor with reports that analyze the data captured by manufacturing, distribution and website activity that show the effectiveness of those packets as an advertising media.

Another object of the present invention is to have the provider furnish the vendor with select data captured by manufacturing, distribution and website activity for vendor manipulation and analysis.

A final object of the present invention is to use insight obtained from the measured data analysis to continue, adjust, modify, and/or terminated all or any portion of the manufacturing specifications, distribution circumstances, and or website content with the intent of improving advertising effectiveness.

These and other objects and advantages of the present invention will become apparent from the following description taken in conjunction where appropriate with the accompanying diagrams wherein are set forth, by way of illustrations and example, certain embodiments of this invention. The diagrams constitute a part of this specification and include exemplary embodiments of the present invention and illustrate various objects and features thereof.

BRIEF DESCRIPTION OF THE DRAWINGS

The invention will be better understood and even other objects than those set forth above will become apparent when consideration is given to the following detailed diagrams showing the functional flow for the present invention.

DETAILED DESCRIPTION OF THE INVENTION

Figure 1:
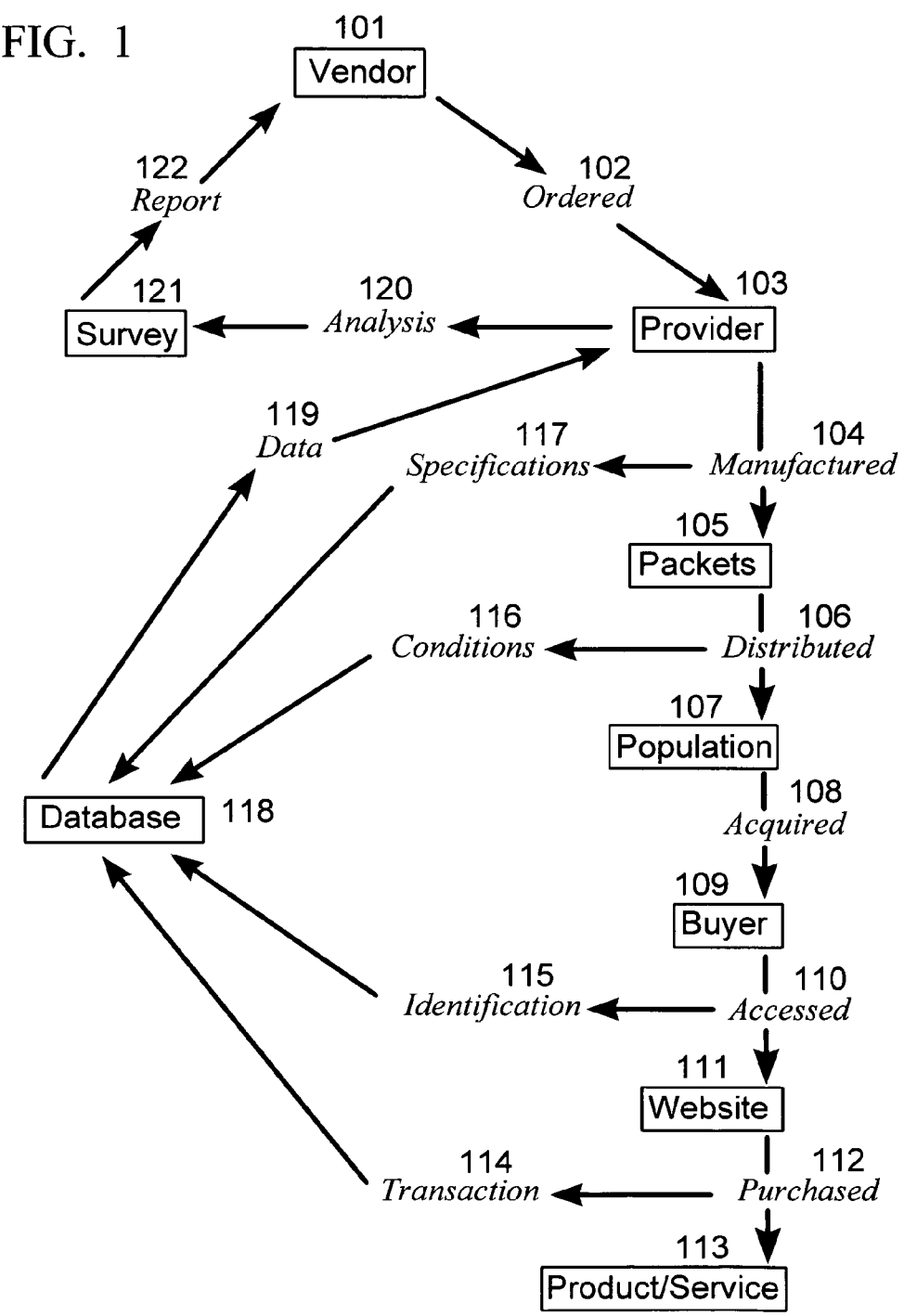
FIG. 1 is a diagram showing the flow of functions between key components wherein liquid packets are manufactured, distributed, and used to facilitate access to a hosted website by a buyer seeking products and services. At each step data is developed and recorded in a database for analysis and reporting whereby the effectiveness of the advertising campaign is measured according to the teachings of the present invention.

While the invention will be described in connection with illustrations, descriptions, and an example of a preferred embodiment, it will be understood these are not intended to limit the present invention only to that embodiment. On the contrary, the present invention is to cover all structural and/or functional alternatives as generally described and defined by the appended claims. The following terms are defined to provide clarity to the subsequent discussions and claims The term "hand sanitizing fluid" as used herein refers to any non-irritating, antimicrobial-containing composition in the form of a fluid, gel, spray, foam, cream, lotion, or tincture preparation designed for frequent use that can reduce the number of transient microorganisms, specifically pathogens, when applied to and dispersed over the hands and other skin areas. Such preparations have a broad antimicrobial spectrum, are fast-acting, and often persistent. Representative of such agents are alcohols (e.g. ethyl and isopropyl), iodines (e.g. hexachlorophene), bisbiquanides (e.g. Chlorhexidine digluconate), and quaternary ammonium salts (e.g. Benzalkonium chloride) which are formulated singularly or in combination. This term is specifically intended to include all such preparations, known and unknown, that are capable of achieving a substantial reduction of skin resident pathogens when applied to the hands or other areas of human skin where such pathogens are found.

The term "resealable packet" as used herein refers to a packet constructed with any polymer film capable of being constructed into a packet packaging form of two principle sidewalls joined at the edges for containment and preservation of a useful liquid. Such polymer films as may prove useful for this purpose have sufficient flexibility to yield to finger pressure, are sufficiently durable to withstand reasonable hydraulic pressure created by fingers, have good crack and puncture resistance, have very good chemical resistance and low gas permeability, and are capable of being sealed to self or other materials. Representatives of single formulation films are polypropylene and polyethylene. Numerous grades, gauges, clarities, colors, textures, manifold laminations of diverse films and foils, formed by many techniques, with numerous properties and qualities, resulting from an even greater numbers of formulations, provide a wide array of polymeric materials to select from, singularly or in combination, to satisfy the specific chemical, physical, and aesthetic attributes required for a specific packet's construction, its content's formulation, and the precise function for which it is intended. In any circumstance where food or drug contact with a polymer material occurs, U.S. FDA approved food grade polymeric material are recommended. The term "resealable packages" is used to describe a more general form of resealable liquid containers than packets incorporate the same general characteristics not specifically dictated by the packet form. All known and yet unknown polymer materials functionally suited for use in constructing resealable packets and packages containing useful liquids are envisioned by use of these terms.

The term "useful liquid" as used herein refers to any substance with the capacity to demonstrate fluidity. Specifically, liquids are described by many forms that include but are not limited to mixtures of homogeneous and non-homogeneous substances, solutions, suspensions, colloids, sols, and similar terms. "Useful" connotes a utility aspect for employing the dispensed liquids characterized by common products, forms, and categories such as additives, adhesives, aftershaves, alcohol solutions, antibiotic ointments, antifungal cream, anti-itch creams, antimicrobial fluids, antiseptic creams, baby formulas, bandages, bath oils, beverages, bleaches, body oils, body washes, breath fresheners, butters, candies, cleaner oils, cleaners, coffee extracts, colognes, colorants, condiments, conditioners, creamers, creams, dairy products, decongestants, deodorants, disinfectants, drinks, edible oils, emulsions, essential oils, eye drops, eye lubricants, fabric conditioners, fabric softeners, fertilizers, flavorings, foods, fragrances, fruit jellies, fruit spreads, fuel treatments, gels, glass cleaners, gravies, greases, hair treatments, hairdressings, hand sanitizers, hand soaps, herbal extracts, honeys, insect repellants, jams, liniments, lip balms, lotions, makeup fluids, margarines, marmalades, medications, mineral solutions, moisturizers, mouthwashes, nectars, oils, ointments, paints, pastes, perfumes, petroleum jellies, polishes, preserves, salad dressings, salsas, sauces, seasonings, shampoos, skin crèmes, skin lotions, skin moisturizers, skin toners, soaps, soups, spices, spreads, stain removers, styling creams, styling gels, sugar solutions, sun screens, sweeteners, syrups, tea extracts, toothpaste, vegetable milks, vegetable oils, vinegars, vitamin solutions, waxes, and similar items, descriptions, and functions. This utility quality of the liquid distinguishes "useful liquids" as defined herein from liquids that are never intended for disbursement from their containers such as those found in gel filled mouse pads and like novelties.

FIG. 1 provides a diagram showing the principles entities, actions, and their interactions that lead to reporting to the vendor measurements that determine the effectiveness of the advertising messages carried by the distributed packets as gauged by website contact facilitated or prompted by the packets, this schema is the subject of the present invention. In FIG. 1 the diagram shows the vendor 101 ordering 102 from a manufacturing provider 103 a number of resealable packets 105 of hand sanitizing fluid (herein the example of a useful liquid). As part of the order 102 and manufacturing 104 processes a series of specification 117 in the form of data elements are created and recorded in a database 118. Representative data elements include characteristics of the fluid such as type, color, viscosity, fragrance, clarity, chemical composition, usage, volatility, shelf life, designation, characterization and similar descriptive properties. The recorded packaging data elements might include size, materials, design, volume, labels, characterization, shape, layout, texts, usage, closure, graphics, colors, images, and similar descriptive properties. The insert and/or cover data elements might include size, materials gauge, shape, type, stiffness, layout, format, configuration, content, text, numbers, website address, identifiers, incentives, colors, appearance, and similar descriptive properties. Also included in the database records would be the order data linking the vendor to the order and the supplying of that order would include data elements such as vendor account number, order provenance, batch numbers, identification codes, price, order date, manufacturing date, ship date, confirmation, account status, and similar examples recorded in the database.

Other categories of data elements derived from the order 102 and manufacturing 104 processes can include manufacturing site, batch number, shipping, production run, proprietary manufacturing, vendor profile, proprietary vendor information, and similar categoric groupings of data elements. And while the database 118 is shown in FIG. 1 as a singular entity it can in fact constitute many distinct interlinking databases 118 each with a distinct form and organization, representative organizing principles include relational, hierarchical, network and object designs. Each database within the database 118 entity is organized by the design best suited to accommodate the recording, updating, and retrieval of data elements recorded within the specific database 118. All databases 118 are held and maintained by the provider 103 so as to facilitate the timely and accurate development and maintenance of the databases 118 authority. Data derived from the order 102 and manufacturing 104 functions involving the vendor and provider entities substantially populate the database 118 by recording this data as data records or elements within the organization appropriate to that database 118 segment.

Once the packets 105 have been manufactured 104 they are shipped to the purchasing vendor 101 for distribution 106. The vendor 101 may chose any number of circumstances for the distributing 106 the packets 105 and may well, in some cases, actually choose to sub-contract the actual distribution 106. In that the packets 105 carry the vendor's 101 website address and an identifier of some nature on each unit, the actual conditions of the dispersion are important to note and record in the database. Whether a batch of packets is simply placed in a bowl on the shop counter, free for the taking, or passed out on the street, or any of a myriad of other ways distributed 106, the conditions 116 of that dispersion will be recorded in the database. This data derived from the distribution process need not be overly specific. For example, a batch of 400 packets 105 of hand sanitizer, with a single group identification code of "AX 123", are placed at the checkout counter of a school library by a local fastfood shop who, as vendor 101, has donated them to the school to improve the individual health of students. Placed in a bowl they are quickly distributed in less than five days. Another batch, designated "AX124" of 200, was distributed at a barbershop during the same period. A third batch, "AX 125" of 400, was also distributed in a bank in the same time frame. All that is required of the vendor 101 is, using software supplied by the provider 103, to quickly complete a dispersal checklist wherein the date, place, and similar data is noted for each group and send it to the provider 103 for updating the database 118. Ranging from this simple input already described to the very elaborate, the reported data could include considerable more detail such as information concerning local festivals, weather conditions, flu outbreaks, position of the dispersal unit, signage employed, associated informational campaigns, personnel at dispersal site, and any number of other factors which may influence the overall effectiveness of the campaign. There are endless conditions 116 and scenarios that can be built around these examples of input. All involve the packets 105 distributed 106 in a population 107 and recording some aspects of the dispersal conditions 116 in a database 118. The default condition, failing any input, is that at some point after the ship date the vendor 101 distributed 106 the packets 105 in to a population 107.

Once the packets 105 have been distributed 106 into a population 107 and acquired 108 by at least one buyer 109, that buyer 109 prompted or facilitated by the packet's website address and general advertising incentives explicitly or implicitly associated with the packet 105 to access 110 the vendor's website 111. Upon accessing 110 the website 111 various buyer 109 and packet 105 identification 115 typically including a name, identification code, email address, or packet identification is recorded as identification 115 data elements recorded on the database 118. Further, data derived from activities within the website 111 are also recorded within the database 118 together with all and any purchases 112, referrals, schedules, or similar functions that provide data elements under a general category described as a transaction 114 which may include a purchase 112 of a vendor 101 product/service 113. Also, buyer 109 assessing 110 of the vendor's website 111 may include coupon generation based on packet 105 data used to obtain specific market incentives in the form of a redeemable reward, all of which is recorded as data elements within the database 118. This is one of many possible forms of offering and inducements found on the website 111.

On demand or by schedule the provider 103 will gather select data from the database 118, selection made based on the intent and nature of the report 122 to be supplied to the vendor 101 which measures the effectiveness of the packet advertising of interest. The provider 103 analysis 120 of the selected data 119 produces a survey 121 which is further enhanced by public and proprietary information, both historic and current, to produce a report 122. Resulting from the analysis, and benefiting from the enhancement organization of the survey 121, the report 122 typically includes a analytical narrative statement, a graphic and statistical representation providing historical, current and predictive perspectives together with a recommendation statement for future and corrective actions. An important contribution provided by the survey 121 activity is to examine and evaluate competitive select advertising strategies known within the system with the intent of improving the advertising effectiveness of the vendor 101 for which the report 122 is directed. Once the survey 121 is reported 122 to the vendor 101 it is intended the insight obtained from the analysis will be used to continue, adjust, modified, and/or terminate all or any portion of the manufacturing specification, distribution circumstances, and/or website content with the intent of improving the vendor's advertising effectiveness.

Figure 2:
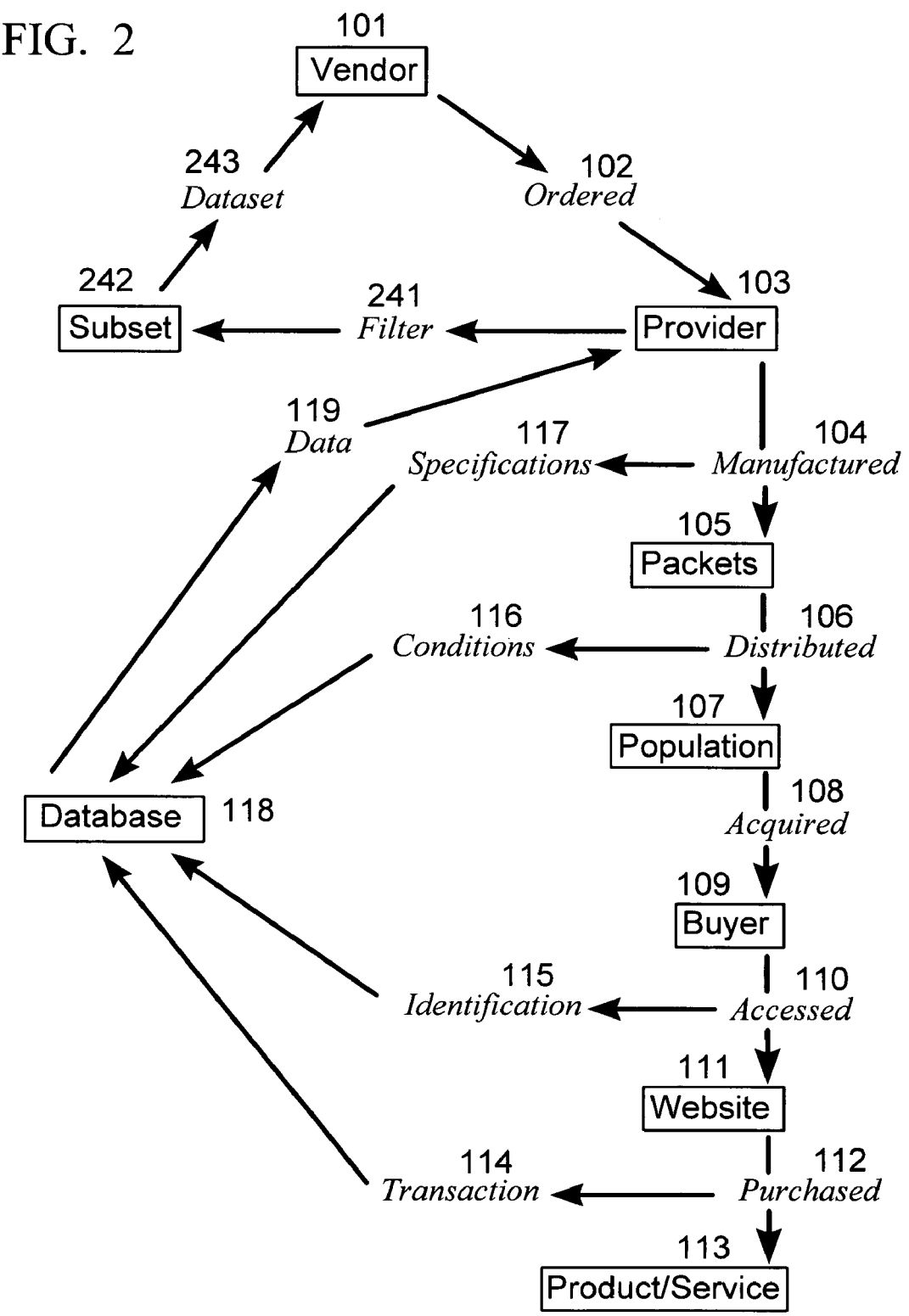
FIG. 2 is a diagram showing the teachings of the present invention where select data is provided to the vendor for manipulation and analysis.

In FIG. 2 all the entities and actions are correspondently number as found in FIG. 1 with the exception of that area where the method shown on FIG. 2 does not have the provider 103 performing an analysis 120 in FIG. 1 of data 119 but instead simply filters 241 that data to create a subset 242 as a dataset 243 to be sent to the vendor 101. The method shown in FIG. 2 is designed to supply the vendor 101 with select raw data 119 in the form of a subset 242 upon which the vendor 101 may perform their own manipulation and subsequent analysis. From this subset 242 the skilled vendor 101 can, through their own analysis developed typically by a software program available on a personal computer, ascertain measurements for various advertising strategies derived from the manufacturing, distribution, and website access data associated with the vendor's packets 105. This optional method as represented in FIG. 2, which lies fully within the boundaries of the present invention as represented in FIG. 1, provides the vendor 101 fuller control of their own efforts in seeking the most effective tools for measuring the effectiveness of direct packet marketing.

A useful liquid has been defined as a large number of fluid products and types capable of being placed in packets or packages. The intent is to identify any liquid that would find acceptance when distributed in a target population containing at least one buyer capable of purchasing a product or service. And while the packet form with hand sanitizing fluid, also both previously defined, is the preferred embodiment of the method, a more generalized form of packaging in packages is equally envisioned for any container capable of holding a liquid and resealable to permit multi-dose dispersal.

It is to be understood that even though numerous characteristics and advantages of the present invention have been set forth in the foregoing description, together with details of the structure, function, and employment of the invention, the disclosures are illustrative only, and changes may be made in details, especially in matters of shape, size, and arrangement of the parts together with content and materials and form utilized, within the principles of the invention to the full extent indicated by the broad general meaning of the terms are expressed. In particular, the foregoing specification and embodiments are intended to be illustrative and are not to be taken as limiting. Thus, alternatives, such as functional equivalents, and other such modifications will become apparent to those skilled in the art upon reading the foregoing description.

What is claimed is:

1. A method for measuring the effectiveness of direct advertising, comprising steps of: manufacturing by a provider for a vendor resealable packages of useful liquid bearing at least one website address and identifier, and recording said address, identifier and other data derived from said manufacturing process in a provider held database; supplying said vendor with said packages for advertising purposes, and recording data derived from said supplying in said database; distributing of said packages in a population including at least one buyer capable of purchasing a produce or service, and recording at least one said package identifier and other data derived from said distribution in said database; accessing a website at said address by said buyer possessing at least one of said packages from which said address prompts or facilitates said access, and obtaining from said buyer at least a name, identification code, email address or said identifier, and recording such data derived from such access in said database; and, analyzing by provider said database and reporting analysis to said vendor so as to provide a means for measuring the effectiveness of at least one advertising strategy derived from the manufacture, distribution, and website access associated with said packages.

2. The method of claim 1 further comprising the step of offering by said website to said buyer inducements on product or service for purchase, and recording data derived from said offering or sale in said database.

3. The method of claim 1 wherein the useful liquid is a hand sanitizing fluid capable of reducing the spread of pathogens in said population and thereby reducing the incidence of sickness and disease therein and encouraging wide distribution and timely retention.

4. The method of claim 1 wherein the packages of useful liquid are resealable packets of useful liquid.

5. The method of claim 1 wherein the packages of useful liquid contain at least one insert.

6. The method of claim 1 wherein the identifier is a serial number, group number, product category, graphic mark, or combination thereof.

7. The method of claim 1 wherein the database is comprised of one or more organizations selected from a group consisting of relational, hierarchical, network and object design.

8. The method of claim 1 wherein said provider hosts and holds both said website and said database.

9. The method of claim 1 wherein the manufactured packages are built to vendor specifications and such specification data is used to create at least one database record.

10. The method of claim 9 wherein descriptive and proprietary data used to create database records derived from the manufacturing specification are selected from a group consisting of fluid type, package layout, insert configuration, communication content and similar characterizing data.

11. The method of claim 1 wherein said reporting comprises one or more narratives, graphic and statistical representations providing one or more historical, current and predictive perspectives.

12. The method of claim 11 wherein said analysis further comprises competitive analysis that compares a select advertising strategy with other similar strategies for effectiveness.

13. The method of claim 1 wherein insight obtained from said analysis is used to continue, adjust, modify, and/or terminated all or any portion of the manufacturing specifications, distribution circumstances, and/or website content with the intent of improving advertising effectiveness.

14. A method for measuring the effectiveness of advertising, comprising steps of: manufacturing by a provider for a vendor resealable packages of useful liquid bearing at least one website address and identifier, and recording said address, identifier and other data derived from said manufacturing process in a provider held database; supplying said vendor with said packages for advertising purposes, and recording data derived from said supplying in said database; distributing of said packages in a population including at least one buyer capable of purchasing a produce or service, and recording at least one said package identifier and other data derived from said distribution in said database; accessing a website at said address by said buyer possessing at least one of said packages from which said address prompts or facilitates said access, and obtaining from said buyer at least a name, identification code, email address or said identifier, and recording such data derived from such access in said database; and, providing by provider select database data to said vendor for analysis so as to provide a means for measuring the effectiveness of at least one advertising strategy derived from the manufacture, distribution, and website access associated with said packages.

15. The method of claim 14 further comprising the step of offering by said website to said buyer inducements on product or service for purchase, and recording data derived from said offering or sale in said database.

16. The method of claim 14 wherein the analysis is performed by use of at least one software program available on a personal computer.

17. The method of claim 14 wherein said reporting comprises one or more narratives, graphic and statistical representations providing one or more historical, current and predictive perspectives.

18. The method of claim 14 wherein said provider hosts and holds both said website and said database.

19. A method for measuring the effect of direct advertising, comprising steps of: manufacturing to vendor specifications resealable packages of useful fluid bearing website addresses and identifiers, and recording data derived from said manufacturing in a database; distributing said packages for advertising purposes, and recording in said database subsequent customer use of such advertising materials to secure vendor goods and services; and, analyzing said database so as to provide a means to measure the effect of select advertising attributes from data recorded regarding said packages.

20. The method of claim 19 further comprising the step of said provider holding, supporting and maintaining said database.

21. The method of claim 19 said analysis comprises one or more narratives, graphic and statistical representations providing one or more historical, current and predictive perspectives.

* * * * *